Oct. 1, 1946.     J. A. HOY     2,408,643
SAFETY FLASHLIGHT FOR PEDESTRIANS AND BICYCLE RIDERS
Filed June 28, 1944
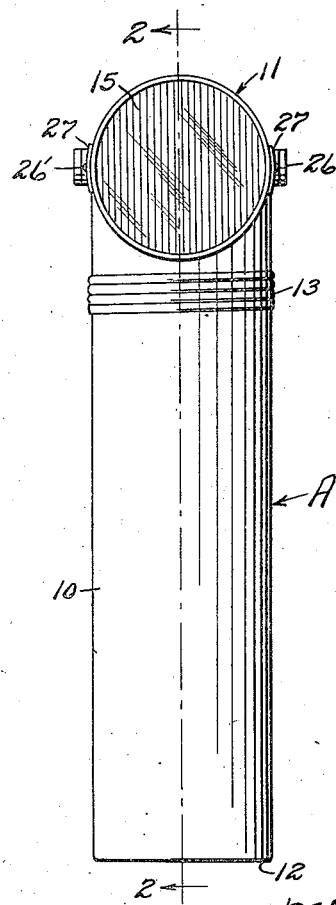
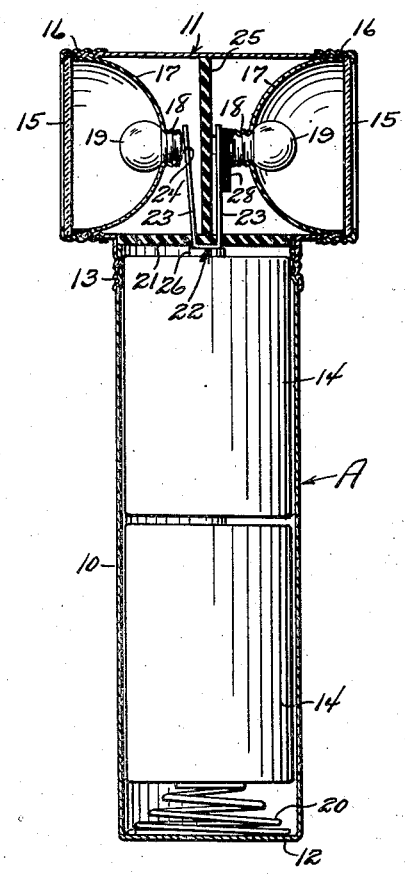
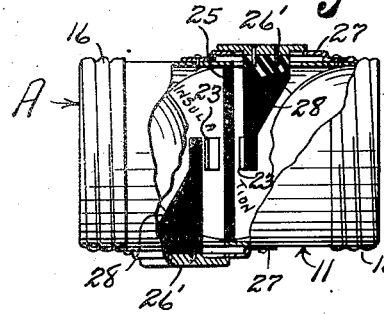
Joseph A. Hoy
INVENTOR.
BY
Victor J. Evans & Co.
ATTORNEYS Patented Oct. 1, 1946

2,408,643

UNITED STATES PATENT OFFICE 2,408,643

SAFETY FLASHLIGHT FOR PEDESTRIANS AND BICYCLE RIDERS

Joseph A. Hoy, Hialeah, Fla.

Application June 28, 1944, Serial No. 542,469

2 Claims. (Cl. 240—10.67)

The invention relates to an electric battery hand lamp, and more especially to a double lighted hand flashlight.

The primary object of the invention is the provision of a light of this character, wherein the construction thereof permits the throwing of light beams in two different directions, that is to say, opposite to one another, which may be of variable color distinctions from each other, each light beam being controlled by a hand switch, so that either one or both lights can be turned on at the option of the user.

Another object of the invention is the provision of a light of this character, wherein the hand switches are located conveniently for the ready and quick turning on and off of the lights at will, the contact for the light bulbs being of a novel construction and arranged in a unique manner, as it is formed in one continuous piece for long life and durability.

A further object of the invention is the provision of a light of this character, wherein the same is usable by pedestrians and bicycle riders or other persons, it being useful for traffic signaling purposes, and its electric circuit and switch arrangements are materially simplified, reducing insulation and material requirements, and assuring compactness and lightness in weight.

A still further object of the invention is the provision of a light of this character, wherein short circuiting is rendered impossible, there being no undue strain on the movable parts, and all parts of the light are readily and easily accessible.

A still further object of the invention is the provision of a light of this character, which is extremely simple in construction, thoroughly reliable and efficient in operation, strong, durable, neat in appearance, easily handled, quick acting, and inexpensive to manufacture.

With these and other objects in view the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is an elevation of the light constructed in accordance with the invention.

Figure 2 is a sectional view taken on the line 2—2 of Figure 1 looking in the direction of the arrows.

Figure 3 is an end view partly broken away of the light.

Similar reference characters indicate corresponding parts throughout the several views in the drawing.

Referring to the drawing, A designates generally the light or lamp constructed in accordance with the invention, and in this instance, comprises a cylindrical battery case 10 and the substantially T-form light projecting head 11, respectively. The case 10 at its end remote from the head 11 is formed with a permanently closed bottom 12, while the opposite end of this case has separable threaded connection with the coupling nipple 13 of the head 11 for access to the interior of the case to permit placement of electric dry batteries 14 therein.

The head 11 which is of tubular form crosswise of the case 10 has fitted therein at opposite open ends thereof lenses 15, removably held in place by cap rims 16, threaded onto the said open ends. Confronting the lenses 15 are reflectors 17, which are threaded into the ends of the head 11, and formed with the central bulb sockets 18 having fitted therein the electric bulbs 19 of standard type, these when lighted have their beams projected by the lenses under reflection of the reflectors.

Carried by the bottom of the case 10 is a spring contact 20 which co-acts with the batteries 14 within said case, and fitted in the nipple 13 is an insulating disk 21 which separates the interior of the case 10 and the interior of the head 11 from each other, this disk 21 being a support for a double tongue substantially U-shaped contact 22, arranged at the center of the said disk, its tongues 23 constituting resilient switch blades for releasibly engaging the button contacts 24 of the bulbs 19. These tongues 23 rise vertically from the disk 21 into the head 11 to be disposed at opposite sides of a central dividing partition 25 of insulating material, within the said head. The contact 22 is adapted for engaging the center contact button 26 of the battery 14 adjacent thereto, and this engagement is brought about by the action of the spring contact 20 against the batteries within the case 10.

At reverse sides of the head 11 and beyond opposite sides of the partition 25 therein are finger-actuated switch control slides 26' which are fitted to tracking plates 27, and carry insulated releasing or throw arms 28 movable into the path of the tongues 23 for retracting the same in their engagement with the bulb buttons 24 for the opening of the circuit between the batteries 14 and the bulbs 19. When retracting pressure by the arms 28 on the tongues 23, the latter through inherent resiliency spring to engagement with the button contacts 24 when the electric circuit becomes closed to the bulbs 19 for the lighting of the lamp. The lamp will throw beams of light in opposite directions or in a single direction at the election of the user thereof, the electric circuit being completed through the case 10, head 11 and the reflectors 17, and spring contact 20, through the batteries 14, when the tongues 23 are engaged with the button contacts 24, and the contact 22 is engaged with the button contact 26 before set forth.

The lenses 15 may be colored differently from each other to throw beams of light of distinguishing hues, if found desirable, and the lamp is adaptable for use by pedestrians, bicycle riders or other persons, and is hand operated.

The lamp may be bracketed onto an object in any desirable manner for the carriage thereof, or it may be carried in the hand or in the pocket of a garment worn by a user.

What is claimed is:

1. A flash-light of the kind described, comprising a battery case for housing an electric battery, a lamp head extending at right angles to the case and having a nipple connection with the said case, lenses in opposite ends of the head, reflectors within the head and confronting the lenses, electric light bulbs carried by the reflectors, a single U-shaped contact having the arms thereof contacting the button contacts of the bulbs and the base thereof contacting the contact button of the battery within the case, and control switches at opposite sides of the head for selectively disengaging the single contact from the bulbs.

2. A flash-light of the kind described, comprising a battery case for housing an electric battery, a lamp head extending at right angles across the case and having a nipple connection with the said case, lenses in opposite ends of the head, reflectors within the head and confronting the lenses, electric light bulbs carried by the reflectors, a single U-shaped contact having the arms thereof contacting the button contacts of the bulbs and the base thereof contacting the contact button of the battery, control switches at opposite sides of the head for selectively disengaging the arms of the single contact from the bulbs, and means within the head to prevent the arms of said contact from engaging each other when said control switches are manipulated.

JOSEPH A. HOY.